(No Model.)  2 Sheets—Sheet 1.

P. BECHE.
HORSE POWER.

No. 278,853.  Patented June 5, 1883.

Attest:
Geo. T. Smallwood Jr.
Edmund Bindhag

Inventor: Peter Beche
By Johnson & Johnson
Attys.

(No Model.)  2 Sheets—Sheet 2.

P. BECHE.
HORSE POWER.

No. 278,853. Patented June 5, 1883.

Attest:
Geo. T. Smallwood Jr.
Edmond Brodhag

Inventor:
Peter Beche
by Johnson & Johnson
Attys

UNITED STATES PATENT OFFICE.

PETER BECHE, OF WILKES-BARRÉ, PENNSYLVANIA.

HORSE-POWER.

SPECIFICATION forming part of Letters Patent No. 278,853, dated June 5, 1883.
Application filed April 24, 1883. (No model.)

*To all whom it may concern:*

Be it known that I, PETER BECHE, a citizen of the United States, residing at Wilkes-Barré, in the county of Luzerne and State of Pennsylvania, have invented new and useful Improvements in Horse-Powers, of which the following is a specification.

My invention relates to that class of horse-powers in which the master-wheel is supported upon a vertically-fixed center shaft by a tapering or inverted-cone-shaped frame, to which the diagonal laterally-extending levers for the attachment of the team are secured; and my improvement therein consists, principally, in a novel construction and arrangement of the main gear-wheel, which imparts the movement from the power to the band fly-wheel pulley, which pulley is mounted upon a shaft carrying at its opposite end a pinion, which is arranged to gear with a spur-gear formed upon the outside of the said main gear-wheel, whereby the same direction of revolution of this band-wheel may be maintained, whether the same be upon the right or left side of the main gear-wheel; or this shaft of the band-wheel may be changed so that its pinion will mesh with the inner spurs of the main gear-wheel, and thereby change the direction of revolution of said band-wheel.

Other matters of improvement, both in construction and combination, will be hereinafter described and specifically claimed.

My invention has for its object the construction of an organized machine operated by horse-power, capable of use for driving general machinery, whether cotton-gins or similar machines. The band-pulley, which communicates the movement from the power to the machinery to be driven, is so arranged, in connection with the boxes for its shaft and the main gear-wheel, into which the pinion on the band-wheel shaft meshes, that it may be readily moved from one side to the other of the frame of the machine, and engage on either side of the main gear-wheel without changing the direction of the revolution of said band-wheel, the object being to bring the band-wheel in proper location relatively to the machinery to be operated upon, and it will make no difference whether the machinery to be driven be located on the floor above or on the same floor with the power, as will hereinafter appear.

Figure 1:
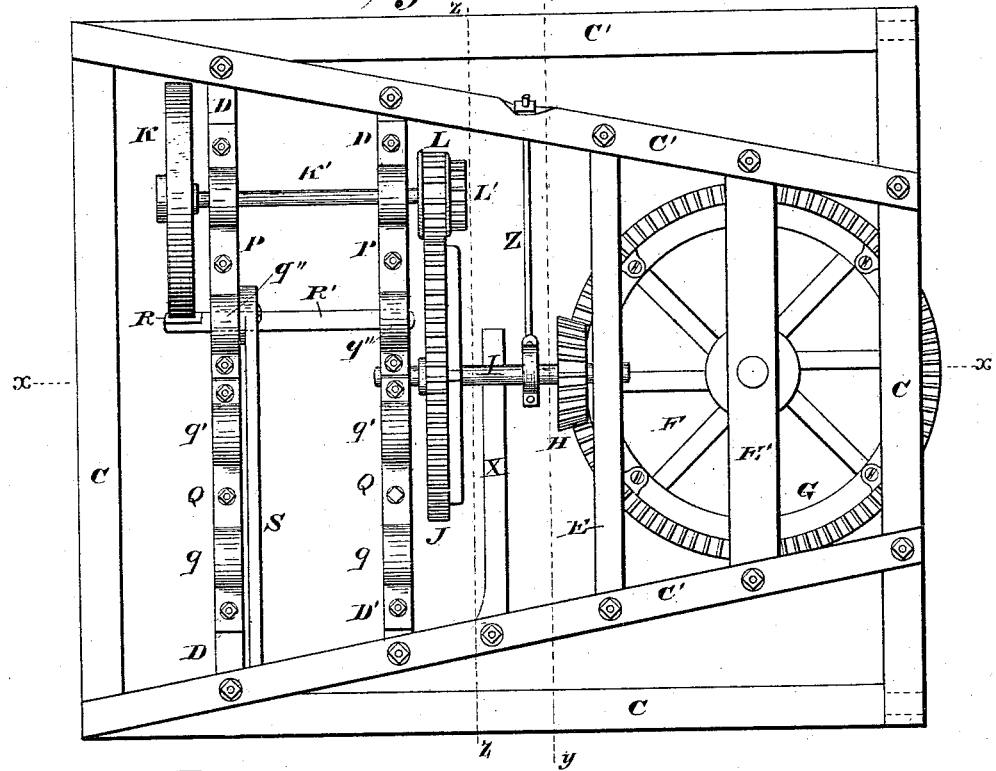
Figure 2:
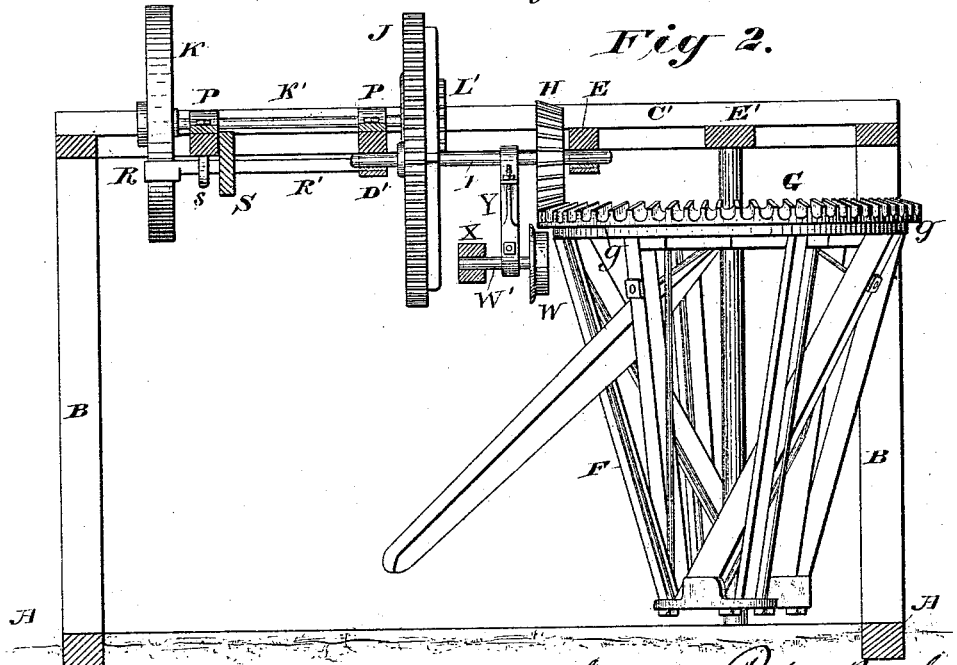
Figure 3:
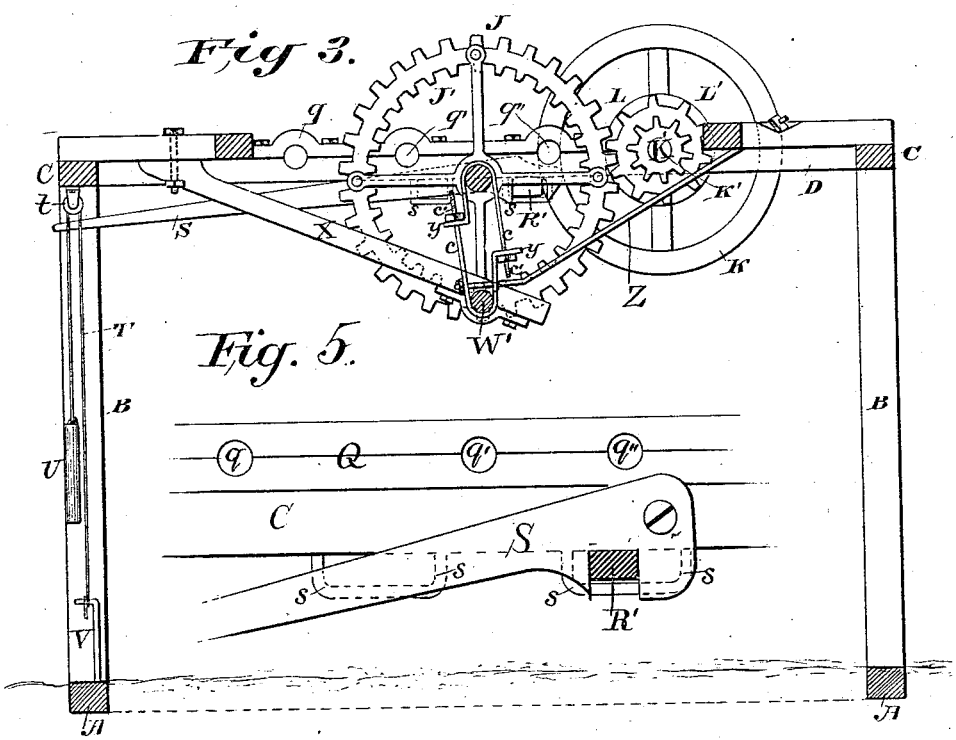
Figure 5:
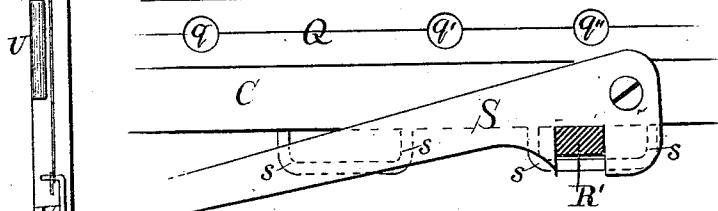
Figure 6:
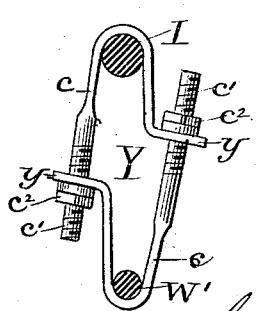

In the accompanying drawings, Figure 1 represents a plan view of a horse-power constructed according to my invention; Fig. 2, a central longitudinal sectional elevation of the same on the line $x\ x$ of Fig. 1; Fig. 3, a transverse sectional elevation on the line $y\ y$, Fig. 1; and Fig. 4, a transverse sectional elevation on the line $z\ z$, Fig. 1, the band-wheel-shaft pinion being shown in gear with the inner spurs of the main gear. Fig. 5 is a detail of the brake-operating lever, and Fig. 6 the suspending-yoke.

Upon base-sills A is supported by posts B a rectangular or other suitable frame, composed of the side beams, C, diagonal braces C', and a series of transverse beams, D D' and E E'.

F is the vertically-arranged horse-power, carrying at its top the master-wheel G. This horse-power being the same as that shown and claimed by me in a patent granted on the 10th of September, 1878, and numbered 207,795, it is not necessary to particularly describe the construction of the same herein. This master-wheel G meshes with a small pinion or gear wheel, H, on a short shaft, I, which carries at its opposite end a large gear or spur wheel, J, on the interior of the rim of which is formed a series of spurs, J'.

K is the band-wheel upon a shaft, K', driven by a spur-pinion, L, meshing with the wheel J.

Figure 4:
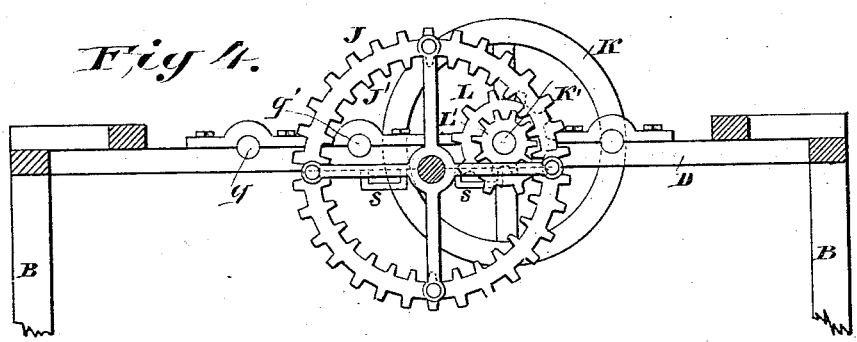

P P are boxes for the shaft K' of the band-wheel K, removably secured to the transverse beams D D'. Q Q are similar boxes arranged to receive the shaft K' of the band-wheel K, also, removably secured in position, and with openings or journal-bearings $q\ q'\ q''$ therein in such position that when the shaft K' is placed in any of these bearings the pinion L is caused to mesh either upon the inner side or outer side of the main gear-wheel and upon either the right or left side thereof. The object of thus constructing and arranging the bearings and boxes for the band-wheel shaft is to enable the position of the band-wheel to be readily changed, so as to bring said band-pulley on either side of the spur-wheel J, if desired, and to mesh with either the inside or outside spurs thereof. The gear-wheel occupying the same relative position as at first, the same direction of movement is preserved to the band-wheel; or the direction of revolution of said band-wheel may be changed, if desired—that is to say, by changing the shaft K' from the position shown, and placing it in the journal-boxes q, the gear-wheel L still meshes with the outside spurs, J, and is driven in the same direction as at first, and by placing the shaft K' in the journal-bearings q' or q'' the gear-wheel L, or a smaller pinion, L', on the face of the pinion L, is caused to mesh with the inside spurs, J', of the wheel J, and a different direction of movement given to the band-wheel, as shown in Fig. 4.

R is a brake-shoe, carried by a pivoted bar, R', and acting against the band fly-wheel, and is operated by a lever, S. This brake R is for stopping the revolution of the machinery in case of accident, and it is, as also its lever S, arranged, by reason of the yokes s, to be moved or adjusted to different positions relatively to the changed positions of the band-wheel should the same be placed in the bearings q, in which case the lever will extend in the opposite direction to that shown, or from the side of the frame C' opposite to its present location. At the end of the said lever S is secured a cord, T, which passes over at one end a pulley, t, attached to the beam C, and has a weight, U, connected thereto. The opposite end of the cord passes downward, and is wrapped around a hook, V, on the base A. The object of this cord attached to the end of the lever which operates the brake-shoe is to operate and secure the brake in its locked position, and by reason of the weight to apply the brake when the cord is unfastened from the securing-hook V.

It is obvious that the belt from the pulley or band-wheel may be applied to operate a planing or other machine in either direction desired.

Instead of the inside spurs being formed on the same rim with the outside spurs of the main gear-wheel J J', as here shown, the inside spurs may be formed on the inside of a separate rim secured to the same arms from the axle that secures the other spurs, or secured directly to the axle. The same result is thereby accomplished in both cases—that of furnishing means whereby the band-wheel may be driven in opposite directions, if desired, without substituting new or different gears, but by simply changing the position of the shaft of the band-wheel so that its pinion will mesh with the different spurs of the main gear-wheel.

In horse-powers having the master-wheel supported as shown it frequently happens that the master-wheel and the small driving-pulley of the machinery to be driven become locked or jump out of gear by reason of the too sudden starting of the team, or the uneven or unequal pulling of the same. To obviate this a flanged wheel, W, upon a short shaft, W', having an end bearing in the bar X, is suspended by a hanger, Y, engaging over the main axle I in such position as to come flush against the under side of a flange, g, formed on the circumference of the master-wheel G for this purpose. The means for supporting this wheel W in proper position beneath the rim of the master-wheel consists of a hanger composed of two similar-formed yokes, c c, and secured to each other and adapted to be adjusted to take up wear, &c. One end of these yokes are bent as shown at y, and the other end is formed into a screw-threaded bolt end, as shown at c'. These screw ends passing through the bent ends y, the two parts of the hanger are united and secured in position by the nuts $c^2$. By this means, by adjusting the nuts $c^2$, the wear of the hanger may be taken up, or the pressure of the wheel W upon the rim of the master-wheel G regulated as desired.

Z is a brace-rod which, in connection with the bearing X for the shaft W' of the wheel W, prevents lateral displacement of the hanger and braces the latter.

I claim—

1. The combination, in a horse-power, of the master-wheel G and its intermeshing gear H with the main gear-wheel, having a double set of spurs, J J', on the same axle, and the band-wheel K and its pinion L or L', adapted to be changed so as to mesh either with the inner or outside spurs, J J', of the main gear-wheel, as and for the purposes described.

2. In a horse-power, the combination, with the master-wheel G and its intermeshing gear H, of the flanged wheel W, and a hanger for supporting said flanged wheel W, composed of two separate yokes passing around the main shaft and the shaft of said flanged wheel and adjustably secured together, and the brace Z, as and for the purposes described.

3. In a horse-power, in combination with the band-wheel K, the pivoted brake-shoe bar R R', and its pivoted interlocking operating-lever S, adapted for change in position with the said shoe-bar R, and having attached at its outer end a cord, T, with weight U, as and for the purposes described.

In testimony whereof I have hereunto set my hand in the presence of two subscribing witnesses.

PETER BECHE.

Witnesses:
M. H. BOYD,
G. S. GROFF.